UNITED STATES PATENT OFFICE.

GEORGE G. CAMPBELL, OF OSWEGO, NEW YORK.

IMPROVEMENT IN ARTICLES OF FOOD.

Specification forming part of Letters Patent No. 135,204, dated January 28, 1873.

*To all whom it may concern:*

Be it known that I, GEORGE G. CAMPBELL, of Oswego, in the county of Oswego and State of New York, have invented an Improvement in the Art of Preparing Grain for Food, of which the following is a specification:

My invention relates to an improved mixture of rye and corn meal to be used in making rye and Indian bread. Its object is to produce a mixture of the two substances in large quantities without the necessity of scalding the corn meal before adding the rye flour, as is the usual custom, so that it may be put upon the market in fit condition for use. The improvement consists in sifting the coarsest stuffs from rye meal through a screen of suitable fineness, and combining it with about an equal quantity of corn meal; the mixture then placed in suitable packages and put upon the market.

The process now in use for making rye and Indian bread is by taking two parts of Indian-corn meal to one part of rye flour; and it is found necessary to scald the corn meal before adding the rye flour in order that the mixture may be fermented uniformly by the use of yeast or its equivalent.

In order that the process herein claimed may be successfully used to produce the new mixture or compound referred to, I will describe it more fully.

First, sift the coarsest stuff from rye meal by means of a wire sieve varying from No. 15 to No. 20 to the inch; then compound it in equal quantities—pound for pound—with corn meal, and mix the compound thoroughly.

By sifting the rye meal to such fineness that its granules will be permeated by the ferment uniformly with the corn meal, I am enabled to avoid the necessity of first scalding the corn meal, which would practically prevent the two meals from being mixed before they were put upon the market.

I put up the product in sacks, boxes, or packages suitable for the consumer or commercial agent, so that when it is desired to make up a batch of rye and Indian bread, griddle-cakes, drop-cakes, or muffins a sufficient quantity of meal can be obtained from a grocer or dealer for one baking, and thus prove a convenient and desirable component of dietetic economy.

I claim as my invention and desire to secure by Letters Patent—

1. The process herein described of passing rye meal through a sieve of suitable fineness, for the purpose specified, and adding to it an equal quantity of Indian meal, the two being then thoroughly mixed for the purpose set forth.

2. A mixture of Indian meal and rye meal, substantially as described, placed in packages, and constituting a new article of manufacture.

GEORGE G. CAMPBELL.

Witnesses:
JOSEPH J. BELANGY,
J. MARTIN.